United States Patent
Wendler

(10) Patent No.: US 12,329,071 B2
(45) Date of Patent: Jun. 17, 2025

(54) METHOD AND SYSTEM FOR AUTOMATICALLY CONTROLLING VENTILATION OF A GRAIN STORAGE BIN TO MAINTAIN THE GRAIN PARAMETERS WITHIN A PREDEFINED RANGE

(71) Applicant: Anthony R Wendler, Armstrong, IA (US)

(72) Inventor: Anthony R Wendler, Armstrong, IA (US)

( * ) Notice: Subject to any disclaimer, the term of this patent is extended or adjusted under 35 U.S.C. 154(b) by 878 days.

(21) Appl. No.: 17/373,795

(22) Filed: Jul. 13, 2021

(65) Prior Publication Data

US 2022/0007587 A1 Jan. 13, 2022

Related U.S. Application Data

(60) Provisional application No. 63/094,917, filed on Oct. 22, 2020, provisional application No. 63/050,876, filed on Jul. 13, 2020.

(51) Int. Cl.
*A01F 25/22* (2006.01)
*A01F 25/16* (2006.01)
*A23B 9/08* (2006.01)

(52) U.S. Cl.
CPC ............ *A01F 25/22* (2013.01); *A01F 25/163* (2013.01); *A23B 9/08* (2013.01)

(58) Field of Classification Search
CPC .................................................... Y02A 40/51
See application file for complete search history.

(56) References Cited

U.S. PATENT DOCUMENTS 3,563,460 A 2/1971 Nine
4,053,991 A 10/1977 Steffen
(Continued)

FOREIGN PATENT DOCUMENTS

CA 2885751 A1 9/2016
CA 3008116 C 8/2020
(Continued)

OTHER PUBLICATIONS

"End Zone—Grain Bin Fan Control" by Farm Shop MFG, Found Online on [Jun. 10, 2021] https://farmshopmfg.com/product/end-zone/.
(Continued)

*Primary Examiner* — Jason Lau
(74) *Attorney, Agent, or Firm* — LEGALFORCE RAPC WORLDWIDE

(57) ABSTRACT

Disclosed are a method and/or system for automatically controlling ventilation of a grain storage bin to maintain the grain parameters within a predefined range. The disclosed system includes a ventilation control system and a plurality of ventilation fans installed to the storage bin. The ventilation control system includes a fan switch control unit, a weather station, and a plurality of grain characteristics monitoring devices. The fan switch control unit includes a first switch and a second switch to constantly operate the plurality of ventilation fans on receiving an alarm signal from the weather station and/or the grain characteristics monitoring devices. The weather station transmits the alarm signal to deactivate plurality of ventilation fans when the captured external parameters deviate from predefined external temperature-humidity range. The grain characteristics monitoring devices transmit the alarm signal to activate plurality of ventilation fans when the captured grain param-
(Continued)

eters deviate from predefined grain temperature-humidity range.

15 Claims, 9 Drawing Sheets

(56) References Cited

U.S. PATENT DOCUMENTS

| | | | |
|---|---|---|---|
| 4,102,194 | A | 7/1978 | Eng |
| 4,175,418 | A | 11/1979 | Steffen et al. |
| 4,253,244 | A | 3/1981 | Kranzler |
| 4,522,335 | A | 6/1985 | Kallestad et al. |
| 4,583,300 | A | 4/1986 | Mast |
| 4,599,809 | A | 7/1986 | Parkes |
| 4,930,229 | A | 6/1990 | Moser |
| 6,129,286 | A | 10/2000 | Vostermans |
| 6,199,388 | B1 | 3/2001 | Fischer, Jr. |
| 9,015,958 | B2 | 4/2015 | Bloemendaal |
| 9,518,753 | B2 | 12/2016 | Mewes et al. |
| 9,788,492 | B2 | 10/2017 | Bloemendaal et al. |
| 9,832,933 | B2 | 12/2017 | Thiessen |
| 10,473,394 | B2 | 11/2019 | Comte |
| 10,893,644 | B2 | 1/2021 | Corte |
| 2003/0033057 | A1 | 2/2003 | Kallestad |
| 2005/0080567 | A1 | 4/2005 | Wieting et al. |
| 2009/0191091 | A1 | 7/2009 | Danchenko et al. |
| 2015/0354895 | A1* | 12/2015 | Bloemendaal .......... F26B 21/10 34/507 |
| 2018/0364746 | A1 | 12/2018 | Boisjoli |

FOREIGN PATENT DOCUMENTS

| | | |
|---|---|---|
| CN | 203152063 U | 8/2013 |
| CN | 104034130 A | 9/2014 |
| CN | 105394174 A | 3/2016 |
| CN | 209930974 U | 1/2020 |
| CN | 210470362 U | 5/2020 |
| CN | 109062296 B | 12/2020 |
| CN | 112650333 A | 4/2021 |
| CN | 113079836 A | 7/2021 |
| KR | 20090128758 A | 3/2011 |
| WO | 1987005685 A1 | 9/1987 |
| WO | 2000053979 A1 | 9/2000 |
| WO | 2017207817 A1 | 12/2017 |

OTHER PUBLICATIONS

"End Zone—Grain Bin Fan Control Overview" by Farm Shop MFG, Found Online on [Jun. 10, 2021] https://farmshopmfg.com/wp-content/uploads/2020/04/EndZone-Grain-Bin-Fan-Control-Overview-3-28-20.pdf.

"End Zone Soybean Touchdown" by Farm Shop MFG, Published Online on [Oct. 22, 2020] https://www.youtube.com/watch?v=GTIII6Ikcrl.

"Agrolog" by Supertech Agrotech, Found Online on [Aug. 19, 2021] https://www.agrolog.io/agrolog?gclid=CjwKCAjwgvilBhBKEiwA10D2j__KQ7pidfDHWOOSPqMISNuAcNvBtX9x6191z5nzGs1QrYcNBHzZbxBoCuIUQAvD_BwE.

"IOT Based Real-Time Control and Monitoring System for Food Grain Procurement and Storage" by L. K. Hema et al., Published in IOP Conf. Series: Materials Science and Engineering (2020) https://iopscience.lop.org/article/10.1088/1757-899X/993/1/012079/pdf.

"Automated Real Time Monitoring for Food Grain Storage" by J.S.Beni Shilpa et al., Published at International Journal of Pure and Applied Mathematics vol. 118 No. 24, Published on [May 21, 2018] https://www.acadpubl.eu/hub/2018-118-24/3/414.pdf.

"Remote Grain Monitoring For Silos and Bulk Storage" by Quanturi, Found Online on [Aug. 19, 2021] https://quanturi.com/pages/grain.

"Automatic, In-bin Grain Drying Using Model Predictive Control" by Lily Ellebracht et al., Published on [Sep. 2, 2015] https://www.ehu.eus/documents/3444171/4484750/127.pdf.

"Temperature Monitoring and Aeration Strategies for Stored Wheat in the Central Plains" by Mark E. Casada et al., Published at ASAE Annual International Meeting/ CIGR XVth World Congress, Published on [Jul. 28, 2002] https://www.ars.usda.gov/ARSUserFiles/30200525/310Aeration-print.pdf.

* cited by examiner

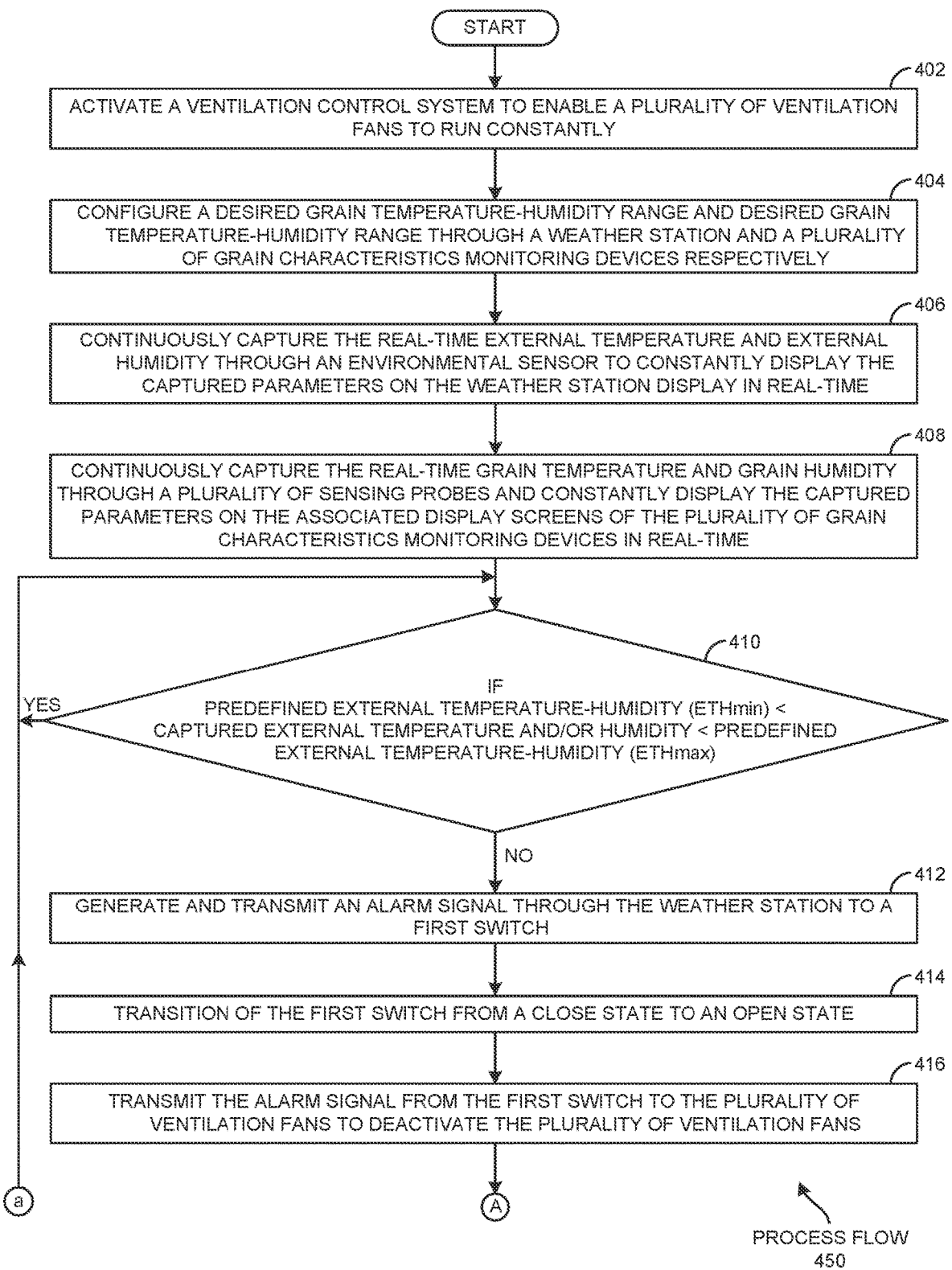

METHOD AND SYSTEM FOR AUTOMATICALLY CONTROLLING VENTILATION OF A GRAIN STORAGE BIN TO MAINTAIN THE GRAIN PARAMETERS WITHIN A PREDEFINED RANGE

CLAIM OF PRIORITY

This application is a U.S. Utility Conversion Patent Application of U.S. Provisional Patent Application No. 63/094,917 titled 'METHOD AND SYSTEM FOR AUTOMATICALLY CONTROLLING A VENTILATION SYSTEM OF A GRAIN STORAGE BIN TO MAINTAIN THE GRAIN PARAMETERS WITHIN A PREDEFINED RANGE' filed on Oct. 22, 2020, and U.S. Provisional patent application No. 63/050,876, titled 'METHOD AND SYSTEM FOR MONITORING THE CHARACTERISTICS OF GRAIN IN A GRAIN STORAGE BIN' filed on Jul. 13, 2020. The content of the aforementioned application is incorporated by reference in entirety thereof.

FIELD OF TECHNOLOGY

This disclosure relates generally to grain ventilation systems and, more particularly, to a method and/or a system for automatically controlling ventilation of a grain storage bin to maintain the grain parameters within a predefined range.

BACKGROUND

The newly harvested grain may not be immediately consumed and/or processed. Rather, the harvested grain may be stored for some period of time in large storage vessels such as grain storage bins. The grain storage bin may be a storage reservoir capable of storing and protecting various agricultural products such as seeds and/or different types of grain (e.g., wheat, corn, and soybeans, etc).

The external temperature variation due to changing seasons may result in an unequal temperature distribution within the grain stored in the storage bin causing natural convection of air through the grain and moisture to migrate therewith. The distribution and/or circulation of air within the grain bin may have an important effect on the ecosystem of stored material. Proper aeration of grain and other feed assists in the drying process while maintaining desired internal moisture levels of the grain and/or feed.

A ventilation system may be used to provide a supply of fresh air and maintain acceptable moisture content within the storage bin. The ventilation systems may generally include various fan units to move volumes of air. However, the conventional ventilation systems installed to the storage bin may require periodic monitoring of the grain parameters within the grain storage bin and activate the ventilation systems when the desired external temperature is observed.

This method may be unreliable which might result in large losses due to activating ventilation systems at undesirable conditions and/or undetected moisture content in the grain bin. Further, poorly controlled moisture and temperature conditions within a grain bin may often lead to cause damage to the stored grain such as excessive moisture, high temperature, and poor grain condition.

SUMMARY

Disclosed are a method and/or a system for automatically controlling ventilation of a grain storage bin to maintain the grain parameters within a predefined range.

In one aspect, an automatic grain ventilation system maintains a predefined temperature-humidity range of the grains stored in a storage bin. The system includes a plurality of ventilation fans and a ventilation control system. The plurality of ventilation fans are installed to the storage bin to enable moving the air through the stored grains. The ventilation control system is mounted on the storage bin. The ventilation control system includes a fan switch control unit, a weather station, a first grain characteristics monitoring device, and a second grain characteristics monitoring device.

The fan switch control unit is coupled to the plurality of ventilation fans to constantly operate the plurality of ventilation fans. The fan switch control unit includes a first switch and a second switch. The first switch and the second switch are solid-state switches to operate in open state and/or close state. Initially, the first switch remains in the close state and the second switch remains in the open state. The first switch and/or the second switch transmit an alarm signal to the plurality of ventilation fans for activation and/or deactivation of the plurality of ventilation fans when the alarm signal is received.

The weather station is configured to set a desired external temperature-humidity range and identify the weather conditions to ventilate the stored grains. The weather station includes an environmental sensor to continuously capture the real-time external temperature and/or external humidity. The weather station also includes a controller to generate the alarm signal and transmit to the first switch of the fan switch control unit.

The controller transmits the alarm signal to the first switch to deactivate the plurality of ventilation fans when the captured external temperature and/or external humidity deviate from a predefined external temperature-humidity range. Further, the controller generates another alarm signal and transmits to the first switch to convert the first switch into close state when the captured external temperature and/or external humidity return within the predefined external temperature-humidity range.

The first grain characteristics monitoring device is coupled to a first sensing probe. The first grain characteristics monitoring device is configured to set a desired grain temperature-humidity range. The first end of the first sensing probe is coupled to the first grain characteristics monitoring device. A second end of the first sensing probe is positioned in the storage bin to continuously capture the real-time temperature-humidity of the surrounding grains.

The first grain characteristics monitoring device includes a first alert controller to generate and transmit the alarm signal to the second switch through the first switch. The first grain characteristics monitoring device transmits the alarm signal to activate the plurality of ventilation fans when the captured grain temperature and/or grain humidity deviate from a predefined grain temperature-humidity range. Further, the first alert controller generates and transmits the alarm signal to the second switch to convert the second switch into open state when the captured grain temperature and/or grain humidity return within the predefined grain temperature-humidity range.

The second grain characteristics monitoring device is coupled to a second sensing probe. The second grain characteristics monitoring device is configured to set a desired grain temperature-humidity range. The first end of the second sensing probe is coupled to the second grain characteristics monitoring device. A second end of the second sensing probe is positioned in the storage bin to continuously capture the real-time temperature-humidity of the surrounding grains.

The second grain characteristics monitoring device includes a second alert controller to generate and transmit the alarm signal to the second switch through the first switch. The second grain characteristics monitoring device transmits the alarm signal to activate the plurality of ventilation fans when the captured grain temperature and/or grain humidity deviate from the predefined grain temperature-humidity range. Further, the second alert controller generates and transmits the alarm signal to the second switch to convert the second switch into open state when the captured grain temperature and/or grain humidity return within the predefined grain temperature-humidity range.

The first switch and the second switch may change their operating states when the alarm signal is received. The first switch and the second switch of the fan switch control unit may be arranged such that the first switch enables the flow of the alarm signal to resist and/or allow it to pass through to the second switch. The fan switch control unit may include a timer circuit to enable the delayed start of the plurality of ventilation fans when the plurality of ventilation fans are activated through the first switch and/or the second switch. The weather station with the controller may be configured to constantly display a digital readout for the real-time external temperature and/or external humidity captured through the environmental sensor on a weather station display.

In addition, the first grain characteristics monitoring device may constantly display a digital readout for the real-time grain temperature and/or grain humidity captured through the first sensing probe on a first display screen of the first grain characteristics monitoring device. The second grain characteristics monitoring device may constantly display a digital readout for the real-time grain temperature and/or grain humidity captured through the second sensing probe on a second display screen of the second grain characteristics monitoring device.

The automatic grain ventilation system may further include an alarm unit mounted on the storage bin to provide an audio signal and/or a visual signal to enable an operator to manually operate the plurality of ventilation fans through the fan switch control unit. The fan switch control unit may include a plurality of operating switches, a set of flashing lights, and a timer unit to enable the operator to manually operate the plurality of ventilation fans on receiving a warning signal from the alarm unit.

The fan switch control unit may furthermore include a relay. The weather station may further include a thermostat sensor. The relay may receive a steady signal from the thermostat sensor before the activation of the plurality of ventilation fans to avoid the short-cycling conditions in the plurality of ventilation fans.

In another aspect, an automatic grain ventilation system includes a grain storage bin, a plurality of ventilation fans, an alarm unit, and a ventilation control system. The plurality of ventilation fans are installed to the grain storage bin to run constantly until an alarm signal is received to the plurality of ventilation fans. The alarm unit is mounted on the grain storage bin to provide an audio signal and/or a visual signal to the operator. The ventilation control system is mounted on the grain storage bin. The ventilation control system includes a fan switch control unit, a weather station, and a plurality of grain characteristics monitoring devices.

The fan switch control unit is coupled to the plurality of ventilation fans to continuously operate the plurality of ventilation fans through a first switch and/or a second switch. The first switch and the second switch are solid-state switches operated in open state and/or close state. The first switch and/or the second switch transmit the alarm signal to the plurality of ventilation fans for activation and/or deactivation of the plurality of ventilation fans. The fan switch control unit includes a timer circuit to enable the delayed start of the plurality of ventilation fans when the plurality of ventilation fans are activated.

The weather station is configured to set a desired external temperature-humidity range and identify the weather conditions to ventilate the stored grains. The weather station includes an environmental sensor to continuously capture the real-time external temperature and/or external humidity. The weather station also includes a controller to generate the alarm signal and transmit to the first switch of the fan switch control unit.

The controller transmits the alarm signal to first switch to deactivate the plurality of ventilation fans when the captured external temperature and/or external humidity deviate from a predefined external temperature-humidity range. Further, the controller generates another alarm signal and transmits the first switch to convert the first switch into close state when the captured external temperature and/or external humidity return within the predefined external temperature-humidity range.

The plurality of grain characteristics monitoring devices is configured to set a desired grain temperature-humidity range and identify the conditions to ventilate the stored grains at multiple locations. Each grain characteristics monitoring device is coupled to at least one sensing probe. One end of each sensing probe is positioned at different locations in the grain storage bin to capture the real-time temperature-humidity of the surrounding grains. Each grain characteristics monitoring device includes an alert controller to generate and transmit the alarm signal to the second switch through the first switch of the fan switch control unit.

The alert controller transmits the alarm signal to the second switch to activate the plurality of ventilation fans when the grain temperature and/or the grain humidity captured through any one of the sensing probes deviate from a predefined grain temperature-humidity range. Further, the alert controller generates and transmits another alarm signal to the second switch through the first switch to convert the second switch into open state when the grain temperature and/or the grain humidity captured through any one of the sensing probes return within the predefined grain temperature-humidity range.

Initially, the first switch may remain in the close state. The second switch may remain in the open state. Each grain characteristics monitoring device may constantly display a digital readout for the real-time grain temperature and/or grain humidity on the associated display screen of the grain characteristics monitoring device. The real-time temperature and humidity of the surrounding grains may be captured through at least one of the sensing probes coupled to the associated grain characteristics monitoring device.

In yet another aspect, a method for automatically controlling ventilation of a grain storage bin includes activating a ventilation control system to constantly run a plurality of ventilation fans until an alarm signal is received to the plurality of ventilation fans. The method includes configuring a desired external temperature-humidity range and a desired grain temperature-humidity range through a weather station and a plurality of grain characteristics monitoring devices respectively.

In addition, the method includes continuously capturing the real-time external temperature and/or external humidity through an environmental sensor coupled to the weather station and constantly displaying the captured parameters on the weather station display in real-time. The method includes continuously capturing the real-time grain temperature and/or grain humidity through a plurality of sensing probes coupled to each grain characteristics monitoring device and constantly displaying the captured parameters on the associated display screens of the plurality of grain characteristics monitoring devices in real-time.

The method includes continuously monitoring the real-time captured external temperature and external humidity for a predefined external temperature-humidity range. The method further includes generating and transmitting the alarm signal to a first switch when the captured external temperature and/or external humidity deviate from the predefined external temperature-humidity range. Initially, the first switch remains in the close state. The method includes transitioning the first switch from close state to open state. The method includes transmitting the alarm signal from the first switch to the plurality of ventilation fans to deactivate the plurality of ventilation fans.

In addition, the method includes generating and transmitting another alarm signal to the first switch of the fan switch control unit when the captured external temperature and/or external humidity is within the predefined external temperature-humidity range. The method includes transitioning the first switch from open state to close state.

The method includes continuously monitoring the real-time captured grain temperature and grain humidity for a predefined grain temperature-humidity range. The method includes generating and transmitting the alarm signal to a second switch through the first switch of the fan switch control unit when the captured grain temperature and/or grain humidity deviate from the predefined grain temperature-humidity range. Initially, the second switch remains in the open state. The method includes transitioning the second switch from open state to close state.

The method includes transmitting the alarm signal from the second switch to the plurality of ventilation fans to activate the plurality of ventilation fans. In addition, the method includes generating and transmitting another alarm signal to the second switch through the first switch when the captured grain temperature and/or grain humidity return within the predefined grain temperature-humidity range. The method includes transitioning the second switch from close state to open state.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 4A-4C is a process flow detailing the operations of the automatic grain ventilation system of FIG. 1 to activate and/or deactivate the plurality of ventilation fans through the weather station and/or the grain characteristics monitoring devices, according to one or more embodiments.

Figure 1:
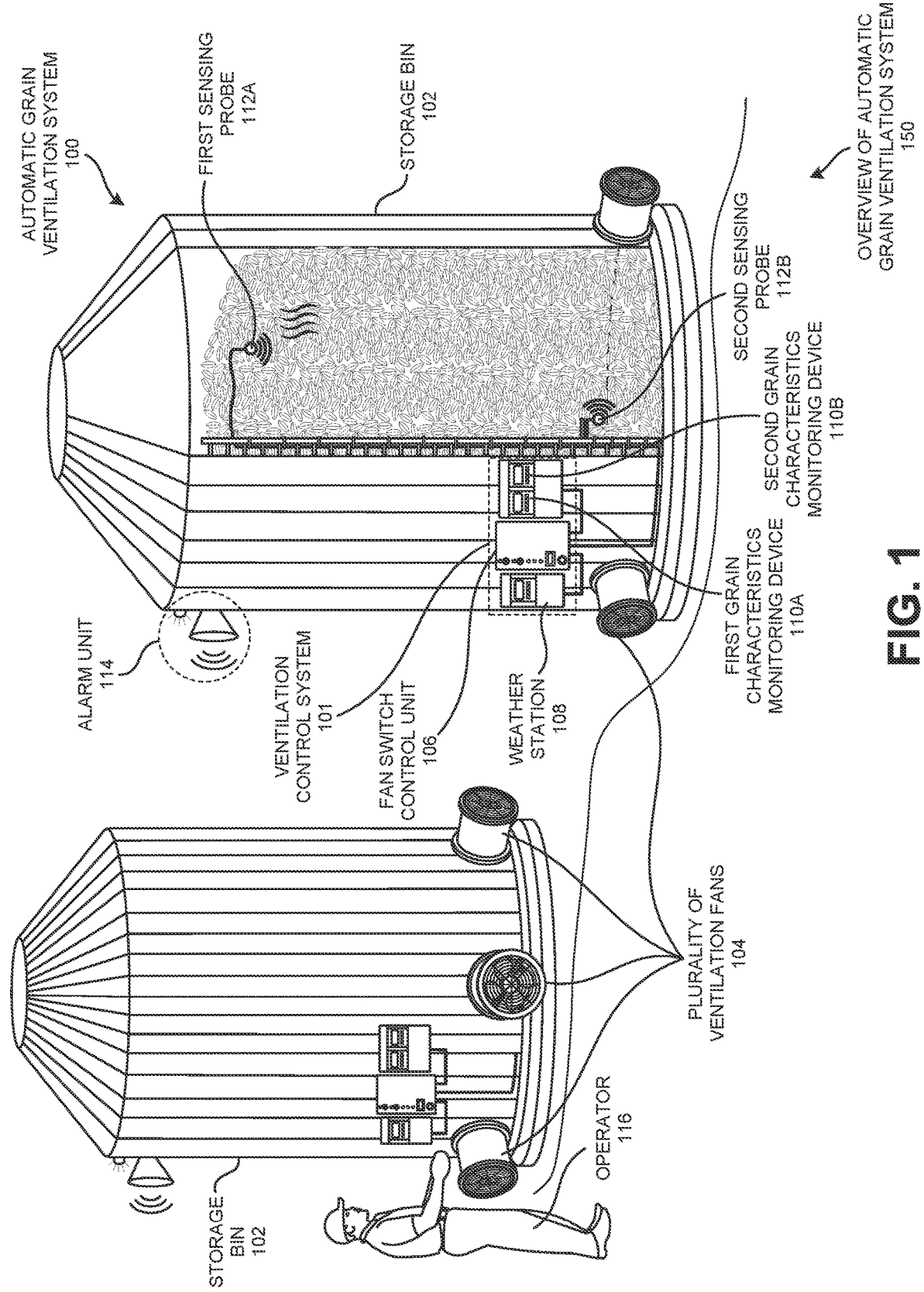
FIG. 1 is an overview of an automatic grain ventilation system to automatically activate and/or deactivate a plurality of ventilation fans to ventilate the stored grain for maintaining the quality of grains, according to one or more embodiments.

Other features of the present embodiments will be apparent from the accompanying drawings and from the detailed description that follows.

DETAILED DESCRIPTION

Example embodiments, as described below, may be used to provide a method and/or a system for automatically controlling ventilation of a grain storage bin to maintain the grain parameters within a predefined range.

In one embodiment, an automatic grain ventilation system 100 maintains a predefined temperature-humidity range 216B of the grains stored in a storage bin 102. The automatic grain ventilation system 100 includes a plurality of ventilation fans 104 and a ventilation control system 101. The plurality of ventilation fans 104 are installed to the storage bin 102 to enable moving the air through the stored grains (e.g., in storage bin 102). The ventilation control system 101 is mounted on the storage bin 102. The ventilation control system 101 includes a fan switch control unit 106, a weather station 108, a first grain characteristics monitoring device 110A, and a second grain characteristics monitoring device 110B.

The fan switch control unit 106 is coupled to the plurality of ventilation fans 104 to constantly operate the plurality of ventilation fans 104. The fan switch control unit 106 includes a first switch 206 and a second switch 208. The first switch 206 and the second switch 208 are solid-state switches to operate in open state and/or close state. Initially, the first switch 206 remains in the close state and the second switch 208 remains in the open state (as shown in FIG. 2C (a)). The first switch 206 and/or the second switch 208 transmit an alarm signal 218 to the plurality of ventilation fans 104 for activation and/or deactivation of the plurality of ventilation fans 104 when the alarm signal 218 is received, according to one embodiment.

The weather station 108 is configured to set a desired external temperature-humidity range 216A and identify the weather conditions to ventilate the stored grains (e.g., in storage bin 102). The weather station 108 includes an environmental sensor 204 to continuously capture the real-time external temperature 300 and/or external humidity 302. The weather station 108 also includes a controller 202 to generate the alarm signal 218 and transmit to the first switch 206 of the fan switch control unit 106, according to one embodiment.

The controller 202 transmits the alarm signal 218 to the first switch 206 to deactivate the plurality of ventilation fans 104 when the captured external temperature 300 and/or external humidity 302 deviate from a predefined external temperature-humidity range 216A. Further, the controller 202 generates another alarm signal 218 and transmits to the first switch 206 to convert the first switch 206 into close state when the captured external temperature 300 and/or external humidity 302 return within the predefined external temperature-humidity range 216A, according to one embodiment.

The first grain characteristics monitoring device 110A is coupled to a first sensing probe 112A. The first grain characteristics monitoring device 110A is configured to set a desired grain temperature-humidity range 216B. A first end of the first sensing probe 112A is coupled to the first grain characteristics monitoring device 110A. A second end of the first sensing probe 112A is positioned in the storage bin 102 to continuously capture the real-time temperature-humidity (e.g., 312A and 314A) of the surrounding grains, according to one embodiment.

The first grain characteristics monitoring device 110A includes a first alert controller 212A to generate and transmit the alarm signal 218 to the second switch 208 through the first switch 206. The first grain characteristics monitoring device 110A transmits the alarm signal 218 to activate the plurality of ventilation fans 104 when the captured grain temperature 312A and/or grain humidity 314A deviate from a predefined grain temperature-humidity range 216B. Further, the first alert controller 212A generates and transmits the alarm signal 218 to the second switch 208 to convert the second switch 208 into open state when the captured grain temperature 312A and/or grain humidity 314A return within the predefined grain temperature-humidity range 216B, according to one embodiment.

The second grain characteristics monitoring device 110B is coupled to a second sensing probe 112B. The second grain characteristics monitoring device 110B is configured to set a desired grain temperature-humidity range 216B. The first end of the second sensing probe 112B is coupled to the second grain characteristics monitoring device 110B. A second end of the second sensing probe 112B is positioned in the storage bin 102 to continuously capture the real-time temperature-humidity (e.g., 312B and 314B) of the surrounding grains, according to one embodiment.

The second grain characteristics monitoring device 110B includes a second alert controller 212B to generate and transmit the alarm signal 218 to the second switch 208 through the first switch 206. The second grain characteristics monitoring device 110B transmits the alarm signal 218 to activate the plurality of ventilation fans 104 when the captured grain temperature 312B and/or grain humidity 314B deviate from the predefined grain temperature-humidity range 216B. Further, the second alert controller 212B generates and transmits the alarm signal 218 to the second switch 208 to convert the second switch 208 into open state when the captured grain temperature 312B and/or grain humidity 314B return within the predefined grain temperature-humidity range 216B, according to one embodiment.

The first switch 206 and the second switch 208 may change their operating states (e.g., open state and/or close state) when the alarm signal 218 is received. The first switch 206 and the second switch 208 of the fan switch control unit 106 may be arranged such that the first switch 206 enables the flow of the alarm signal 218 to resist and/or allow it to pass through to the second switch 208. The fan switch control unit 106 may include a timer circuit 210 to enable the delayed start of the plurality of ventilation fans 104 when the plurality of ventilation fans 104 are activated through the first switch 206 and/or the second switch 208. The weather station 108 with the controller 202 may be configured to constantly display a digital readout for the real-time external temperature 300 and/or external humidity 302 captured through the environmental sensor 204 on a weather station display 200, according to one embodiment.

In addition, the first grain characteristics monitoring device 110A may constantly display a digital readout for the real-time grain temperature 312A and/or grain humidity 314A captured through the first sensing probe 112A on a first display screen 214A of the first grain characteristics monitoring device 110A. The second grain characteristics monitoring device 110B may constantly display a digital readout for the real-time grain temperature 312B and/or grain humidity 314B captured through the second sensing probe 112B on a second display screen 214B of the second grain characteristics monitoring device 110B, according to one embodiment.

The automatic grain ventilation system 100 may further include an alarm unit 114 mounted on the storage bin 102 to provide an audio signal and/or a visual signal to enable an operator 116 to manually operate the plurality of ventilation fans 104 through the fan switch control unit 106. The fan switch control unit 106 may include a plurality of operating switches (e.g., first operating switch 304 and second operating switch 306), a set of flashing lights 308, and a timer unit 310 to enable the operator 116 to manually operate the plurality of ventilation fans 104 on receiving a warning signal from the alarm unit 114, according to one embodiment.

The fan switch control unit 106 may furthermore include a relay. The weather station 108 may further include a thermostat sensor. The relay may receive a steady signal from the thermostat sensor before the activation of the plurality of ventilation fans 104 to avoid the short-cycling conditions in the plurality of ventilation fans 104, according to one embodiment.

In another embodiment, an automatic grain ventilation system 100 includes a grain storage bin 102, a plurality of ventilation fans 104, an alarm unit 114, and a ventilation control system 101. The plurality of ventilation fans 104 are installed to the grain storage bin 102 to run constantly until an alarm signal 218 (e.g., from first switch 206) is received to the plurality of ventilation fans 104. The alarm unit 114 is mounted on the grain storage bin 102 to provide an audio signal and/or a visual signal to the operator 116. The ventilation control system 101 is mounted on the grain storage bin 102. The ventilation control system 101 includes a fan switch control unit 106, a weather station 108, and a plurality of grain characteristics monitoring devices 316.

The fan switch control unit 106 is coupled to the plurality of ventilation fans 104 to continuously operate the plurality of ventilation fans 104 through a first switch 206 and/or a second switch 208. The first switch 206 and the second switch 208 are solid-state switches operated in open state and/or close state. The first switch 206 and/or the second switch 208 transmits the alarm signal 218 to the plurality of ventilation fans 104 for activation and/or deactivation of the plurality of ventilation fans 104. The fan switch control unit 106 includes a timer circuit 210 to enable the delayed start of the plurality of ventilation fans 104 when the plurality of ventilation fans 104 are activated, according to one embodiment.

The weather station 108 is configured to set a desired external temperature-humidity range 216A and identify the weather conditions to ventilate the stored grains (e.g., in storage bin 102). The weather station 108 includes an environmental sensor 204 to continuously capture the real-time external temperature 300 and/or external humidity 302. The weather station 108 also includes a controller 202 to generate the alarm signal 218 and transmit to the first switch 206 of the fan switch control unit 106, according to one embodiment.

The controller 202 transmits the alarm signal 214 to first switch 206 to deactivate the plurality of ventilation fans 104 when the captured external temperature 300 and/or external humidity 302 deviate from a predefined external temperature-humidity range 216A. Further, the controller 202 generates another alarm signal 218 and transmits the first switch 206 to convert the first switch 206 into close state when the captured external temperature 300 and/or external humidity 302 return within the predefined external temperature-humidity range 216A, according to one embodiment.

The plurality of grain characteristics monitoring devices 316 is configured to set a desired grain temperature-humidity range 216B and identify the conditions to ventilate the stored grains at multiple locations (e.g., in storage bin 102). Each grain characteristics monitoring device (e.g., 316-1 to 316-N) is coupled to at least one sensing probe (e.g., 112A and/or 112B). One end of each sensing probe (112A and/or 112B) is positioned at different locations in the grain storage bin 102 to capture the real-time temperature-humidity (e.g., 312A,312B and 314A,314B) of the surrounding grains. Each grain characteristics monitoring device (e.g., 316-1 to 316-N) includes an alert controller (e.g., 212A and 21B) to generate and transmit the alarm signal 218 to the second switch 208 through the first switch 206 of the fan switch control unit 106, according to one embodiment.

The alert controller (e.g., 212A and 21B) transmits the alarm signal 218 to the second switch 208 to activate the plurality of ventilation fans 104 when the grain temperature 312A,312B and/or the grain humidity 314A,314B captured through any one of the sensing probes (e.g., 112A and/or 112B) deviate from a predefined grain temperature-humidity range 216B. Further, the alert controller (e.g., 212A and 21B) generates and transmits another alarm signal 218 to the second switch 208 through the first switch 206 to convert the second switch 208 into open state when the grain temperature 312A,312B and/or the grain humidity 314A,314B captured through any one of the sensing probes (e.g., 112A and/or 112B) return within the predefined grain temperature-humidity range 216B, according to one embodiment.

Initially, the first switch 206 may remain in the close state (as shown in FIG. 2C (a)). The second switch 208 may remain in the open state. Each grain characteristics monitoring device (e.g., 316-1 to 316-N) may constantly display a digital readout for the real-time grain temperature 312A, 312B and/or grain humidity 314A,314B on the associated display screen (e.g., 214A and/or 214B) of the grain characteristics monitoring device (e.g., 316-1 to 316-N). The real-time temperature 312A,312B and humidity 314A,314B of the surrounding grains may be captured through at least one of the sensing probes (e.g., 112A and/or 112B) coupled to the associated grain characteristics monitoring device (e.g., 316-1 to 316-N), according to one embodiment.

In yet another embodiment, a method for automatically controlling ventilation of a grain storage bin 102 includes activating a ventilation control system 101 to constantly run a plurality of ventilation fans 104 until an alarm signal 218 is received to the plurality of ventilation fans 104. The method includes configuring a desired external temperature-humidity range 216A and a desired grain temperature-humidity range 216B through a weather station 108 and a plurality of grain characteristics monitoring devices (e.g., 110A, 110B and/or 316) respectively.

In addition, the method includes continuously capturing the real-time external temperature 300 and/or external humidity 302 through an environmental sensor 204 coupled to the weather station 108 and constantly displaying the captured parameters (e.g., 300 and 302) on the weather station display 200 in real-time. The method includes continuously capturing the real-time grain temperature 312A, 312B and/or grain humidity 314A,314B through a plurality of sensing probes (e.g., 112A and/or 112B) coupled to each grain characteristics monitoring device (e.g., e.g., 110A, 110B and/or 316) and constantly displaying the captured parameters (e.g., 312A,312B and/or 314A,314B) on the associated display screens (e.g., 214A and 214B) of the plurality of grain characteristics monitoring devices (e.g., e.g., 110A, 110B and/or 316) in real-time, according to one embodiment.

The method includes continuously monitoring the real-time captured external temperature 300 and external humidity 302 for a predefined external temperature-humidity range 216A. The method includes generating and transmitting the alarm signal 218 to a first switch 206 when the captured external temperature 300 and/or external humidity 302 deviate from the predefined external temperature-humidity range 216A. Initially, the first switch 206 remains in a close state (as shown in FIG. 2C (a)). The method includes transitioning the first switch 206 from close state to open state. The method includes transmitting the alarm signal 218 from the first switch 206 to the plurality of ventilation fans 104 to deactivate the plurality of ventilation fans 104, according to one embodiment.

In addition, the method includes generating and transmitting another alarm signal 218 to the first switch 206 of the fan switch control unit 106 when the captured external temperature 300 and/or external humidity 302 is within the predefined external temperature-humidity range 216A. The method includes transitioning the first switch 206 from open state to close state, according to one embodiment.

The method includes continuously monitoring the real-time captured grain temperature 312A,312B and grain humidity 314A,314B for a predefined grain temperature-humidity range 216B. The method includes generating and transmitting the alarm signal 218 to a second switch 208 through the first switch 206 of the fan switch control unit 104 when the captured grain temperature 312A,312B and/or grain humidity 314A,314B deviate from the predefined grain temperature-humidity range 216B. Initially, the second switch 208 remains in the open state (as shown in FIG. 2C (a)). The method includes transitioning the second switch 208 from open state to close state. The method includes transmitting the alarm signal 218 from the second switch 208 to the plurality of ventilation fans 104 to activate the plurality of ventilation fans 104, according to one embodiment.

In addition, the method includes generating and transmitting another alarm signal 218 to the second switch 208 through the first switch 206 when the captured grain temperature 312A,312B and/or grain humidity 314A,314B return within the predefined grain temperature-humidity range 216B. The method includes transitioning the second switch 208 from close state to open state, according to one embodiment.

FIG. 1 is an overview 150 of the automatic grain ventilation system 100 to automatically activate and/or deactivate the plurality of ventilation fans 104 to ventilate the stored grain (e.g., in the storage bin 102) for maintaining the quality of grains, according to one or more embodiments. In particular, FIG. 1 shows an automatic grain ventilation system 100, a ventilation control system 101, a storage bin 102, a plurality of ventilation fans 104, a fan switch control unit 106, a weather station 108, a first grain characteristics monitoring device 110A, a second grain characteristics monitoring device 110B, a first sensing probe 112A, a second sensing probe 112B, an alarm unit 114 and an operator 116, according to one embodiment.

The automatic grain ventilation system 100 may help to accurately add moisture to and/or remove moisture from the food grain stored in the storage bin 102. The automatic grain ventilation system 100 may help to avoid losses due to food grain spoilage. The automatic grain ventilation system 100 may automatically deactivate the plurality of ventilation fans 104 when the external temperature 300 and/or the external humidity 302 get too high and/or too low to prevent the stored grains from over-drying and/or saturating, according to one embodiment.

The ventilation control system 101 may be configured to automatically operate the plurality of ventilation fans 104 installed to the storage bin 102 for accurate natural air drying of the stored grains at predefined weather conditions (e.g., external temperature 300 and/or external humidity 302). The ventilation control system 101 may constantly operate the plurality of ventilation fans 104 without any human intervention to keep the stored grains at the best quality possible, according to one embodiment.

The storage bin 102 may be a large size metal reservoir capable of storing and protecting various agricultural products such as seed and/or different types of food grains (e.g., wheat, rice, corn, and soybeans, etc.). The plurality of ventilation fans 104 may be blowers installed through the openings of the storage bin 102 to enable the air circulation within the storage bin 102. The plurality of ventilation fans 104 may enable air circulation at considerably lower airflow rates. The plurality of ventilation fans 104 may be located at different positions on the storage bin 102 to ventilate the stored grains uniformly, according to one embodiment.

In another embodiment, the automatic grain ventilation system 100 may include at least one ventilation fan 104 installed to the storage bin 102.

The fan switch control unit 106 may be a component of the ventilation control system 101 designed to trigger the plurality of ventilation fans 104 to activate and/or deactivate through the switches (e.g., first switch 206 and/or second switch 208). The fan switch control 106 unit may enable switching to the weather station 108 only while lacking the alarm signal 218. The weather station 108 may be an electronic device designed to continuously monitor the real-time external temperature 300 and/or external humidity 302 pertaining to air being used to ventilate the stored grains, according to one embodiment.

The first grain characteristics monitoring device 110A and the second grain characteristics monitoring device 110B may be the electronic devices designed to continuously monitor the real-time grain temperature 312A,312B and/or grain humidity 314A,314B to enable the ventilation of the stored grains. Each grain characteristics monitoring device (e.g., 110A and 110B) may enable the operator 116 to connect at least one sensing probe (e.g., first sensing probe 112A and/or second sensing probe 112B), according to one embodiment.

The first sensing probe 112A and the second sensing probe 112B may be the long cables positioned in the storage bin 102 to provide the real-time grain temperature 312A, 312B and/or grain humidity 314A,314B measurement of the surrounding grains. The sensing probes (e.g., 112A and 112B) may be long enough (e.g., about 50 feet) to position anywhere within the storage bin 102, according to one embodiment.

The first sensing probe 112A and the second sensing probe 112B may enable the ventilation control system 101 to capture the grain temperature 312A,312B and/or the grain humidity 314A,314B at different locations within the storage bin 102. The sensing probes (e.g., 112A and 112B) may allow the operator 116 to monitor more layers through the storage bin 102. The alarm unit 114 may be a circuitry configured to produce an audible and/or visual signal for a short duration to alert the operator 116 when the plurality of ventilation fans 104 are activated and/or deactivated. The alarm unit 114 may be simultaneously triggered with the plurality of ventilation fans 104 through the fan switch control unit 106. The alarm unit 114 may have a 10 m cord for mounting in a more accessible area on the storage bin 102. The alarm unit 114 may include an industrial siren and/or a visual indicator, according to one embodiment.

The operator 116 may be a farmer and/or a grain storage manager monitoring a plurality of grain storage reservoirs (e.g., storage bin 102) to avoid losses due to food grain spoilage and keep grains at the best quality possible. The operator 116 may be able to set a desired external temperature-humidity range 216A through the weather station 108. The operator 116 may further set a desired grain temperature-humidity range 216B for each sensing probe (e.g., 112A and 112B) through the grain characteristics monitoring device (e.g., 110A and/or 110B). The operator 116 may be able to position the sensing probes (e.g., 112A and 112B) at the desired location in the storage bin 102, according to one embodiment.

FIG. 1 illustrates the automatic grain ventilation system 100 may enable the operator 116 to automatically control the plurality of ventilation fans 104 installed to the grain storage bins 102 (e.g., mounted with the weather station 108, the fan switch control unit 106, and the grain characteristics monitoring devices (e.g., 110A and 110B)) in the grain storage warehouse. FIG. 1 illustrates the storage bin 102 is filled with dried grains and the sensing probes (e.g., 112A and 112B) are positioned in the storage bin 102 to capture the real-time grain characteristics (e.g., 312A,312B and 314A, 314B) of the stored grains, according to one embodiment.

FIG. 1 further illustrates the plurality of ventilation fans 104 installed to the storage bin 102 to automatically ventilate the stored grains based on the alarm signal 218 received from the weather station 108 and/or the grain characteristics monitoring devices (e.g., 110A and 110B) of the ventilation control system 101. FIG. 1 also shows the alarm unit 114 mounted on the storage bin 102 to alert the operator 116 when the plurality of ventilation fans 104 are activated and/or deactivated, according to one embodiment.

Figure 2A:
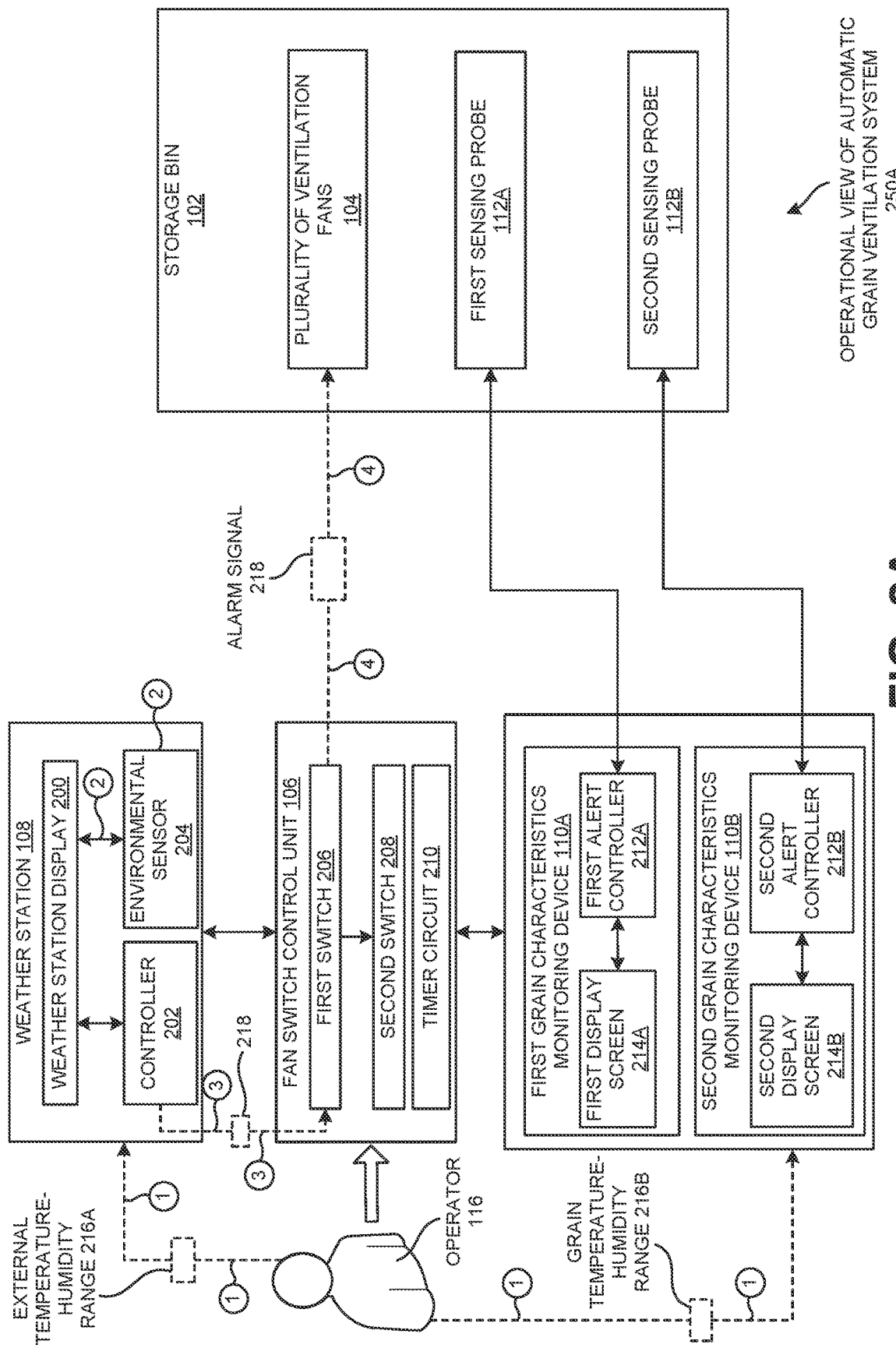
FIG. 2A is an operational view of the automatic grain ventilation system of FIG. 1 to transmit an alarm signal from a fan switch control unit to the plurality of ventilation fans based on an external temperature and/or external humidity captured through an environmental sensor of a weather station, according to one or more embodiments.

FIG. 2A is an operational view 250A of the automatic grain ventilation system 100 of FIG. 1 to transmit the alarm signal 218 from the fan switch control unit 106 to the plurality of ventilation fans 104 based on the external temperature 300 and/or external humidity 302 captured through the environmental sensor 204 of the weather station 108, according to one or more embodiments. In particular, FIG. 2A shows a weather station display 200, a controller 202, an environmental sensor 204, a first switch 206, a second switch 208, a timer circuit 210, a first alert controller 212A, a second alert controller 212B, a first display screen 214A, a second display screen 214B, an external temperature-humidity range 216A, a grain temperature-humidity range 216B, and an alarm signal 218, according to one embodiment.

The weather station display 200 may be a screen of the weather station 108 to continuously show the real-time external temperature 300 and/or external humidity 302 captured through the environmental sensor 204. The weather station display 200 may show an alarm indicator icon to specify that the plurality of ventilation fans 104 are operated through the weather station 108, according to one embodiment.

The controller 202 may be an algorithm of the weather station 108 to generate and transmit the alarm signal 218 to deactivate the plurality of ventilation fans 104. Further, the controller 202 may compare the external temperature 300 and/or external humidity 302 with the external temperature-humidity range 216A predefined by the operator 116. The environmental sensor 204 may be a device for constantly capturing the external environmental parameters (e.g., external temperature 300, external humidity 302, heat losses, etc.) of the storage bin 102, according to one embodiment.

The first switch 206 and the second switch 208 may be the solid-state switches of the fan switch control unit 106 to control the functioning of the plurality of ventilation fans 104 based on the input (e.g., alarm signal 218) received from the weather station 108 and/or the grain characteristics monitoring devices (e.g., 110A and 110B). The first switch 206 in close state may enable flow current to the plurality of ventilation fans 104 to run constantly until the alarm signal 218 is received from the weather station 108 to deactivate the plurality of ventilation fans 104, according to one embodiment.

The first switch 206 in close state may allow the alarm signal 218 to flow through the first switch 206 to the second switch 208. The first switch 206 may receive only a deactivation signal (e.g., alarm signal 218) from the weather station 108 to convert the first switch 206 into open state. Further, the first switch 206 converted into open state may prevent the flow of the alarm signal 218 through the first switch 206 to the second switch 208. The first switch 206 may automatically get reconverted into a close state when the captured external temperature 300 and/or external humidity 302 return within the predefined external temperature-humidity range 216A, according to one embodiment.

The second switch 208 may be operative only when the first switch 206 is in close state. The second switch 208 may get converted into a close state when the alarm signal 218 is received from the grain characteristics monitoring device (e.g., 110A and/or 110B) to the fan switch control unit 106. The second switch 208 in close state may allow 120 V current to flow through to activate the plurality of ventilation fans 104 installed to the storage bin 102. The alarm signal 218 received from the grain characteristics monitoring device (e.g., 110A and/or 110B) to the second switch 208 may convert the second switch 208 into open state, according to one embodiment.

The timer circuit 210 may enable the plurality of ventilation fans 104 to start with time delay intervals when the alarm signal 218 (e.g., for activation) is received from the first switch 206 and/or the second switch 208. The timer circuit 210 may be able to delay the start of the plurality of ventilation fans 104 with a time interval of at least 5 seconds. The timer circuit 210 may take a few seconds to activate all the plurality of ventilation fans 104 to ventilate the stored grains, according to one embodiment.

In another embodiment, the fan switch control unit 106 may further include a fan speed control module to automatically regulate the speed of the plurality of ventilation fans 104.

The first alert controller 212A and the second alert controller 212B may be the algorithms of the first grain characteristics monitoring device 110A and the second grain characteristics monitoring device 110B respectively to generate and transmit the alarm signal 218 (e.g., activation signal) to activate the plurality of ventilation fans 104. Further, the first alert controller 212A and the second alert controller 212B may compare the grain temperature 312A, 312B and/or the grain humidity 314A,314B with the grain temperature-humidity range 216B predefined by the operator 116, according to one embodiment.

The first display screen 214A and the second display screen 214B may continuously show the real-time grain temperature 312A,312B and/or grain humidity 314A,314B captured through the first sensing probe 112A and the second sensing probe 112B respectively. The display screens (e.g., 214A and 214B) may show an alarm indicator icon to specify that the plurality of ventilation fans 104 are activated through the particular sensing probe (e.g., 112A and/or 112B), according to one embodiment.

The external temperature-humidity range 216A may be a desired upper and lower limit set for the external temperature 300 and/or the external humidity 302 of the air (e.g., outside of the storage bin 102) being used to ventilate the stored grains. The grain temperature-humidity range 216B may be a desired upper and lower limit set for the temperature 312A,312B and/or humidity 314A,314B of the stored grains (e.g., in the storage bin 102) to maintain the quality of the stored grains, according to one embodiment.

The alarm signal 218 may be a signal transmitted from any one of the controllers (e.g., controller 202, first alert controller 212A and/or second alert controller 212B) to the switches (e.g., 206 and/or 208) of the fan switch control unit 106 to operate the plurality of ventilation fans 104. The alarm signal 218 may be generated by the controller (e.g., 202, 212A and/or 212B) based on the external temperature-humidity range 216A and/or the grain temperature-humidity range 216B predefined by the operator 116, according to one embodiment.

FIG. 2A illustrates the number of operations between the operator 116, the weather station 108, the fan switch control unit 106, and the plurality of ventilation fans 104. Particularly, circle '1' of FIG. 2A illustrates the external temperature-humidity range 216A and the grain temperature-humidity range 216B being set by the operator 116 through the weather station 108 and the grain characteristics monitoring devices (e.g., 110A and 110B). The circle '2' shows the external temperature 300 and/or the external humidity 302 being captured through the environmental sensor 204 and displayed in real-time on the weather station display 200, according to one embodiment.

The circle '3' shows the controller 202 of the weather station 108 generates the alarm signal 218 when the captured external temperature 300 and/or external humidity 302 deviate from the external temperature-humidity range 216A. The circle '3' further shows the alarm signal 218 is being transmitted to the first switch 206 of the fan switch control unit 106 through the controller 202. The circle '4' illustrates the alarm signal 218 is being transmitted from the first switch 206 to the plurality of ventilation fans 104 installed to the storage bin 102 to deactivate the plurality of ventilation fans 104, according to one embodiment.

Figure 2B:
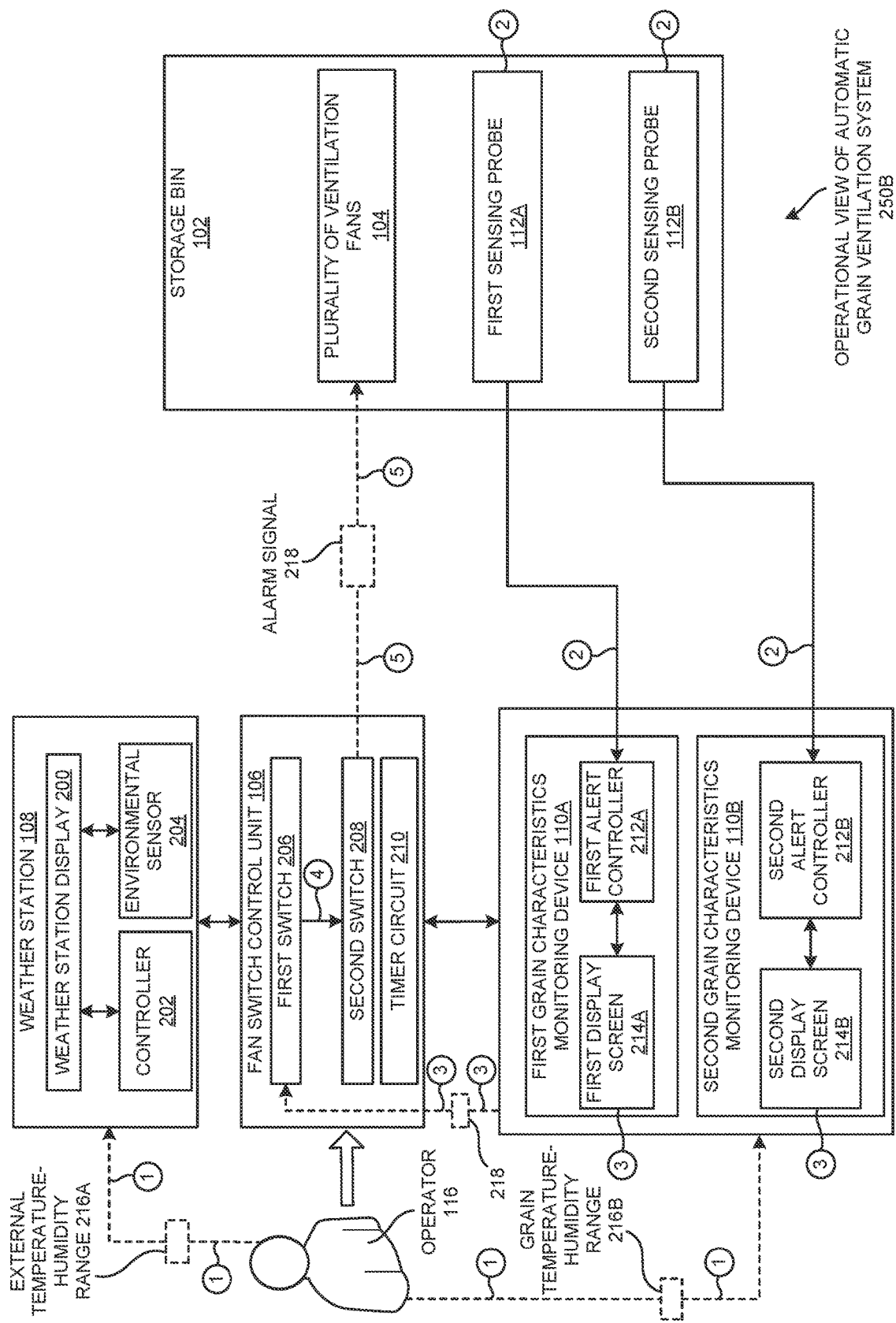
FIG. 2B is another operational view of the automatic grain ventilation system of FIG. 1 to transmit the alarm signal from the fan switch control unit to the plurality of ventilation fans based on a grain temperature and/or grain humidity captured through the sensing probes connected to the grain characteristics monitoring devices, according to one or more embodiments.
Figure 2C:
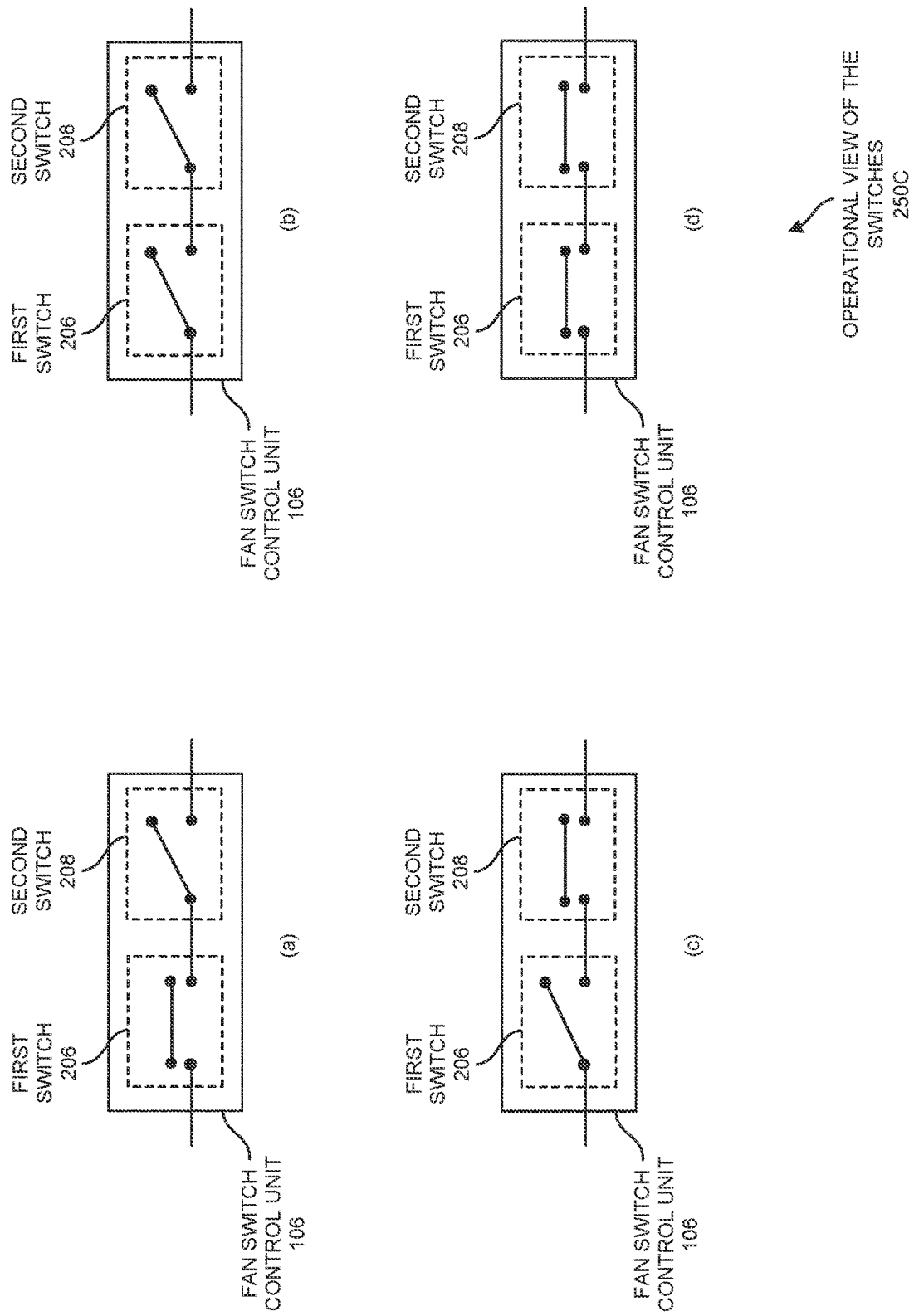
FIG. 2C is yet another operational view of the switches of the fan switch control unit of FIG. 1 illustrating various operating modes of the switches to activate and/or deactivate the plurality of ventilation fans, according to one or more embodiments.

FIG. 2B is another operational view 250B of the automatic grain ventilation system 100 of FIG. 1 to transmit the alarm signal 218 from the fan switch control unit 106 to the plurality of ventilation fans 104 based on the grain temperature 312A,312B and/or grain humidity 314A,314B captured through the sensing probes (e.g., 112A and 112B) connected to the grain characteristics monitoring devices (e.g., 110A and 110B), according to one or more embodiments.

FIG. 2B illustrates the number of operations between the operator 116, the grain characteristics monitoring devices (e.g., 110A and 110B), the fan switch control unit 106, and the plurality of ventilation fans 104. Particularly, circle '1' of FIG. 2B illustrates the external temperature-humidity range 216A and the grain temperature-humidity range 216B being set by the operator 116 through the weather station 108 and the grain characteristics monitoring devices (e.g., 110A and 110B). The circle '2' shows the grain temperature 312A,312B and/or the grain humidity 314A,314B being captured through the sensing probes (e.g., 112A and 112B) and simultaneously displayed in real-time on the display screens (e.g., 214A and/or 214B). The circle '3' shows one of the alert controllers (e.g., 212A and/or 212B) of the grain characteristics monitoring device (e.g., 110A and/or 110B) generates the alarm signal 218 when the captured grain temperature 312A,312B and/or grain humidity 314A,314B deviate from the grain temperature-humidity range 216B, according to one embodiment.

The circle '3' further shows the alarm signal 218 is being transmitted to the first switch 206 of the fan switch control unit 106 through any of the alert controllers (e.g., 212A and/or 212B). The circle '4' shows the first switch 206 (e.g., in close state) enabling the alarm signal 218 to flow through to the second switch 208. The circle '5' illustrates the alarm signal 218 is being transmitted from the second switch 208 to the plurality of ventilation fans 104 installed to the storage bin 102 to activate the plurality of ventilation fans 104, according to one embodiment.

FIG. 2C is yet another operational view 250C of the switches (e.g., first switch 206 and second switch 208) of the fan switch control unit 106 of FIG. 1 illustrating various operating modes of the switches (e.g., 206 and 208) to activate and/or deactivate the plurality of ventilation fans 104, according to one or more embodiments.

FIG. 2C illustrates the number of operating modes of the first switch 206 and the second switch 208 of the fan switch control unit 106 to operate the plurality of ventilation fans 104. Particularly, FIG. 2C (a) illustrates the initial state of the first switch 206 (e.g., in close state) and the second switch 208 (e.g., in open state) to keep the plurality of ventilation fans 104 activated when the captured external temperature 300 and/or external humidity 302 is within the external temperature-humidity range 216A, according to one embodiment.

FIG. 2C (b) shows both the first switch 206 and the second switch 208 are in open state to keep the plurality of ventilation fans 104 deactivated. The operating mode (b) may be observed when the captured external temperature 300 and/or external humidity 302 deviate from the external temperature-humidity range 216A and the captured grain temperature 312A,312B and/or grain humidity 314A,314B is within the grain temperature-humidity range 216B, according to one embodiment.

FIG. 2C (c) shows the first switch 206 in open state and the second switch 208 in close state to keep the plurality of ventilation fans 104 deactivated. The operating mode (c) may be observed when the captured external temperature 300 and/or external humidity 302 deviate from the external temperature-humidity range 216A and the captured grain temperature 312A,312B and/or grain humidity 314A,314B deviate the grain temperature-humidity range 216B. In operating mode (c), the first switch 206 resists the flow of the alarm signal 218 to pass through to the second switch 208, according to one embodiment.

FIG. 2C (d) shows both the first switch 206 and the second switch 208 are in a close state to keep the plurality of ventilation fans 104 activated. The operating mode (d) may be observed when the captured external temperature 300 and/or external humidity 302 is within the external temperature-humidity range 216A and the captured grain temperature 312A,312B and/or grain humidity 314A,314B deviate from the grain temperature-humidity range 216B. In operating mode (d), the first switch 206 allows the flow of the alarm signal 218 to pass through to the second switch 208 to activate the plurality of ventilation fans 104, according to one embodiment.

Figure 3A:
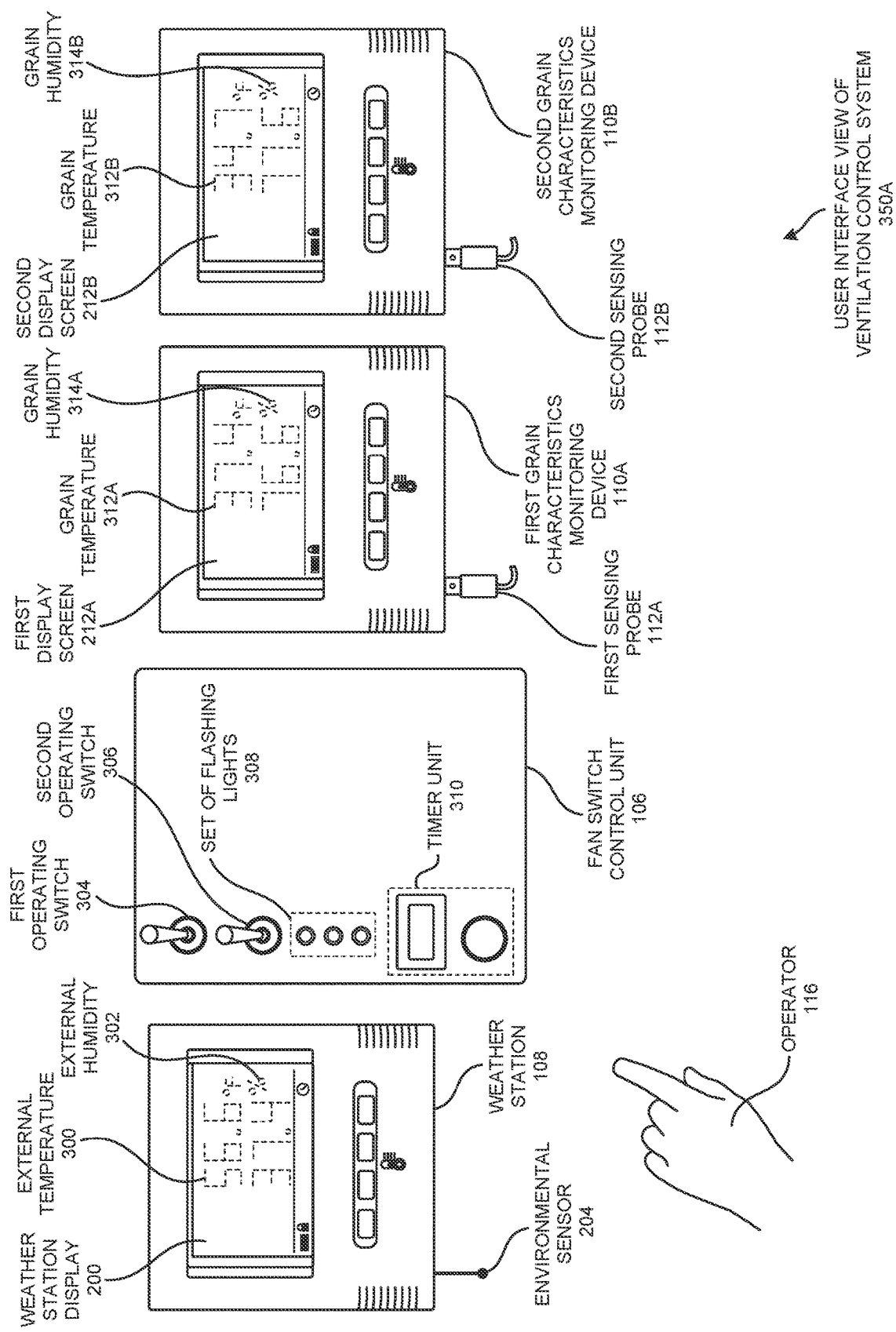
FIG. 3A is a user interface view of the ventilation control system of FIG. 1 displaying the real-time external temperature and/or external humidity and the real-time grain temperature and/or grain humidity captured through the environmental sensor and the sensing probes, according to one or more embodiments.

FIG. 3A is a user interface view 350A of the ventilation control system 101 of FIG. 1 displaying the real-time external temperature 300 and/or external humidity 302 and the real-time grain temperature 312A,312B and/or grain humidity 314A,314B captured through the environmental sensor 204 and the sensing probes (e.g., 112A and 112B), according to one or more embodiments. In particular, FIG. 3A shows an external temperature 300, an external humidity 302, a first operating switch 304, a second operating switch 306, a set of flashing lights 308, a timer unit 310, a grain temperature 312A, a grain temperature 312B, a grain humidity 314A, and a grain humidity 314B, according to one embodiment.

The external temperature 300 may be an intensity of heat present in the air (e.g., outside of the storage bin 102) being used to ventilate the stored grains. The external humidity 302 may be an amount of moisture present in the air (e.g., outside of the storage bin 102) being used to ventilate the stored grains. The first operating switch 304 and the second operating switch 306 may be the switches on the fan switch control unit 106 to change the operating mode of the ventilation control system 101, according to one embodiment.

The first operating switch 304 may enable the operator 116 to set the ventilation control system 101 in automatic and/or manual operating mode to ventilate the stored grains. The second operating switch 306 may enable the operator 116 to set the ventilation control system 101 to ventilate the stored grains with the weather station 108 only and/or the weather station 108 and the grain characteristics monitoring device (e.g., 110A and 110B) together. The set of flashing lights 308 may be a plurality of lights to indicate the various functions of the ventilation control system 101. The timer unit 310 may keep track of the usage of the plurality ventilation fans 104. The timer unit 310 may include an hour meter and a reset switch, according to one embodiment.

The grain temperature 312A, 312B may be an intensity of heat present in the surrounding grains (e.g., inside the storage bin 102) captured through the first sensing probe 112A and the second sensing probe 112B respectively. The grain humidity 314A, 314B may be an amount of moisture present in surrounded grains (e.g., inside the storage bin 102) captured through the first sensing probe 112A and the second sensing probe 112B respectively, according to one embodiment.

FIG. 3A illustrates the weather station 108 of the ventilation control system 101 enabling the operator 116 to observe the real-time external temperature 300 and/or external humidity 302 captured through the environmental sensor 204 on the weather station display 200. FIG. 3A illustrates the fan switch control unit 106 enabling the operator 116 to change the operating mode of the ventilation control system 101. FIG. 3A further illustrates the set of flashing lights 308 on the fan switch control unit to indicate the various functions being performed by the ventilation control system 101. FIG. 3A illustrates the grain characteristics monitoring devices (e.g., 110A and 110B) enabling the operator 116 to observe the captured real-time grain temperature 312A, 312B and/or grain humidity 314A,314B on the display screens (e.g., 212A and 212B), according to one embodiment.

Figure 3B:
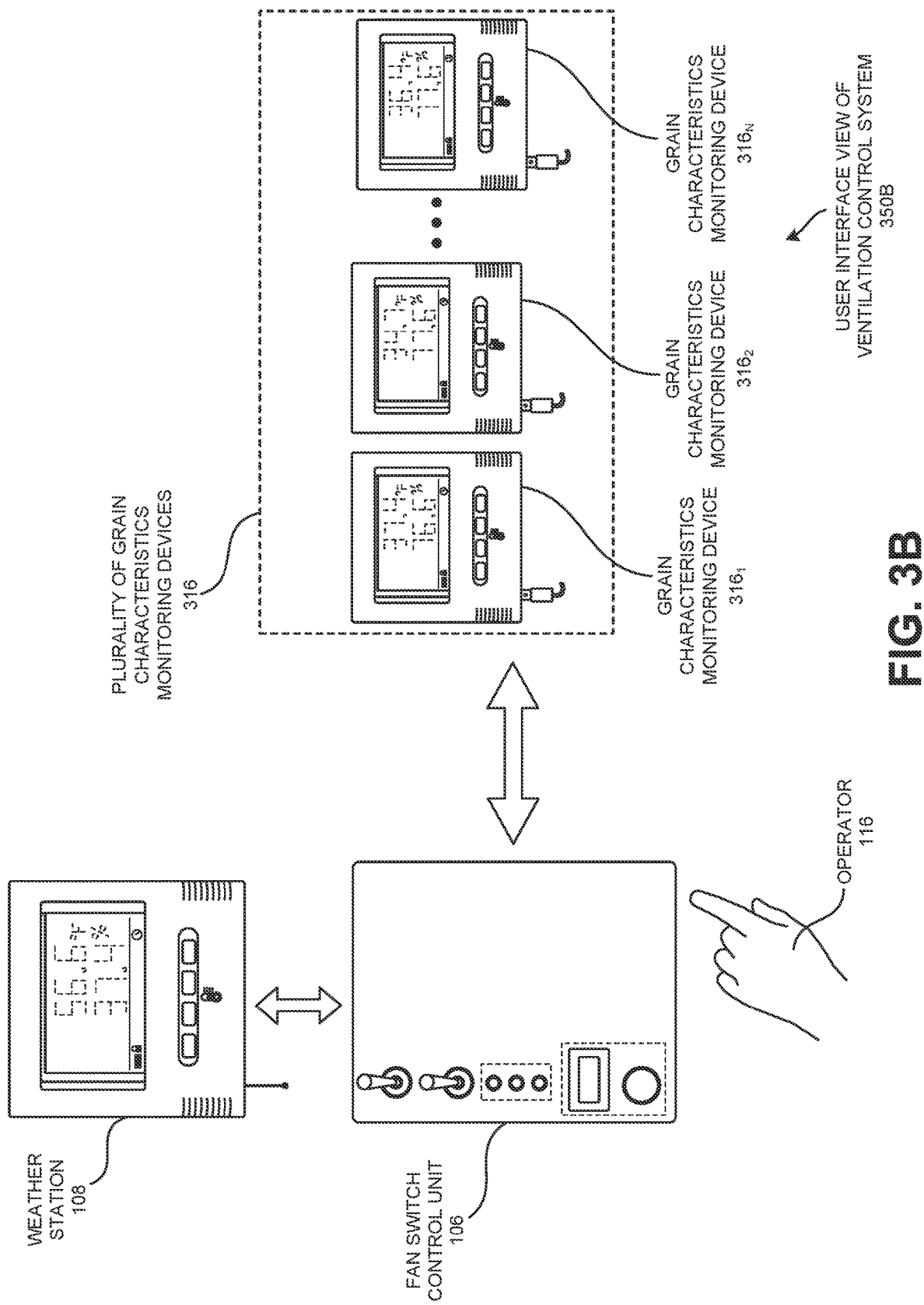
FIG. 3B is another user interface view of another embodiment of the ventilation control system of FIG. 1 displaying the real-time grain parameters captured at multiple locations in the storage bin through multiple units of the grain characteristics monitoring device, according to one or more embodiments.

FIG. 3B is another user interface view 350B of another embodiment of the ventilation control system 101 of FIG. 1 displaying the real-time grain parameters (e.g., 312A,312B and 314A,314B) captured at multiple locations in the storage bin 102 through a plurality of the grain characteristics monitoring devices 316, according to one or more embodiments. In particular, FIG. 3B shows a plurality of grain characteristics monitoring devices 316, according to one embodiment.

The plurality of grain characteristics monitoring devices 316 (e.g., multiple units of grain characteristics monitoring devices 110A and 110B) may enable the operator 116 to simultaneously observe the captured real-time grain parameters (e.g., 312A,312B and 314A,314B) at multiple locations in the storage bin 102. Each grain characteristics monitoring device (e.g., 316-1 to 316-N) may be connected with at least one sensing probe (e.g., 112A and/or 112B) to display the captured real-time grain parameters (e.g., 312A, 312B and 314A,314B) of the surrounding grains, according to one embodiment.

FIG. 3B illustrates the weather station 108 of the ventilation control system 101 enabling the operator 116 to observe the captured real-time external parameters (e.g., 300 and 302) on the weather station display 200. FIG. 3B further illustrates the plurality of grain characteristics monitoring devices 316 enabling the operator 116 to simultaneously observe the captured real-time grain parameters (e.g., 312A, 312B and 314A,314B) at multiple locations in the storage bin 102, according to one embodiment.

In another embodiment, the ventilation control system 101 may include only one grain characteristics monitoring device (e.g., 110A and/or 110B) installed to the storage bin 102.

Figure 4B:
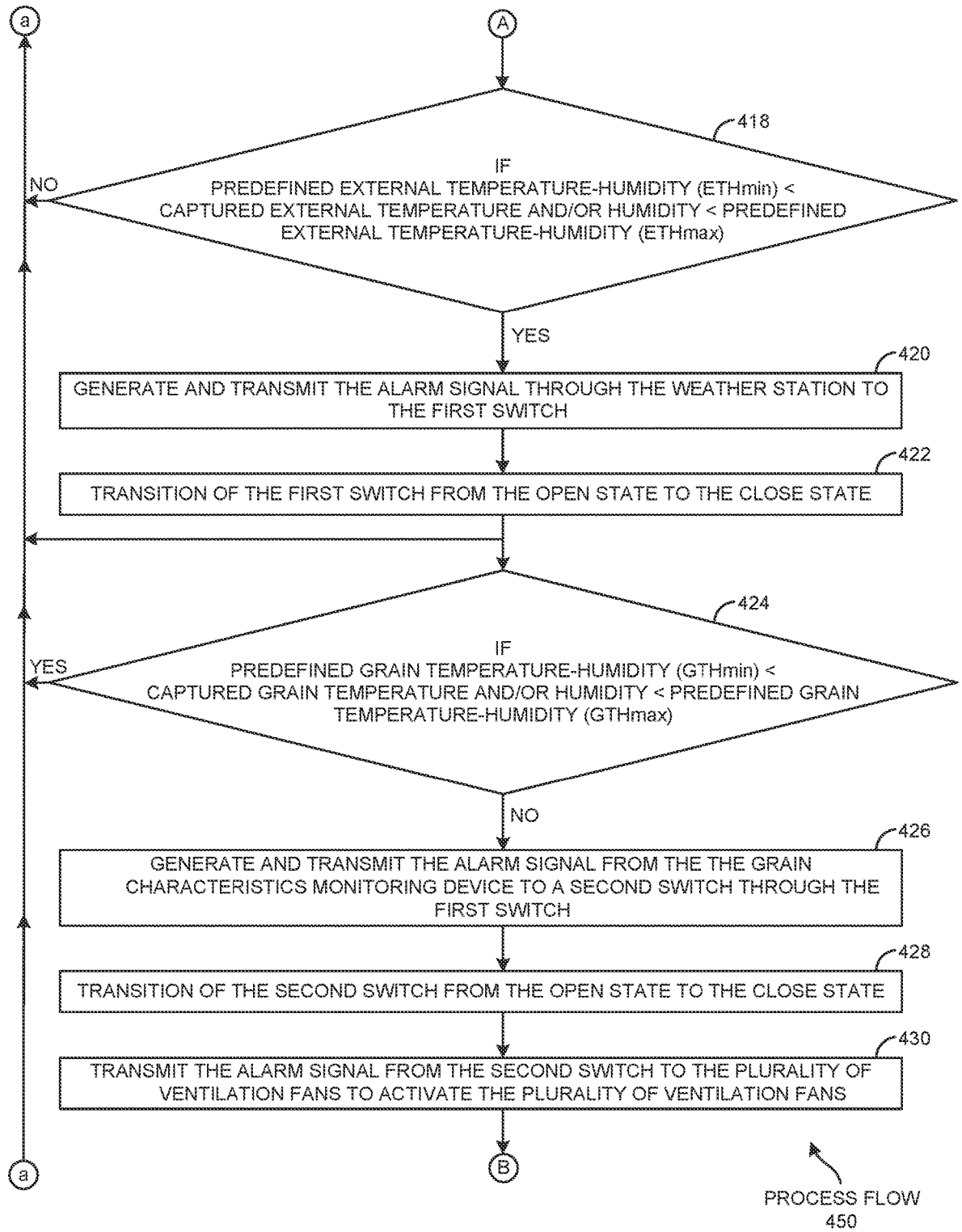
Figure 4C:
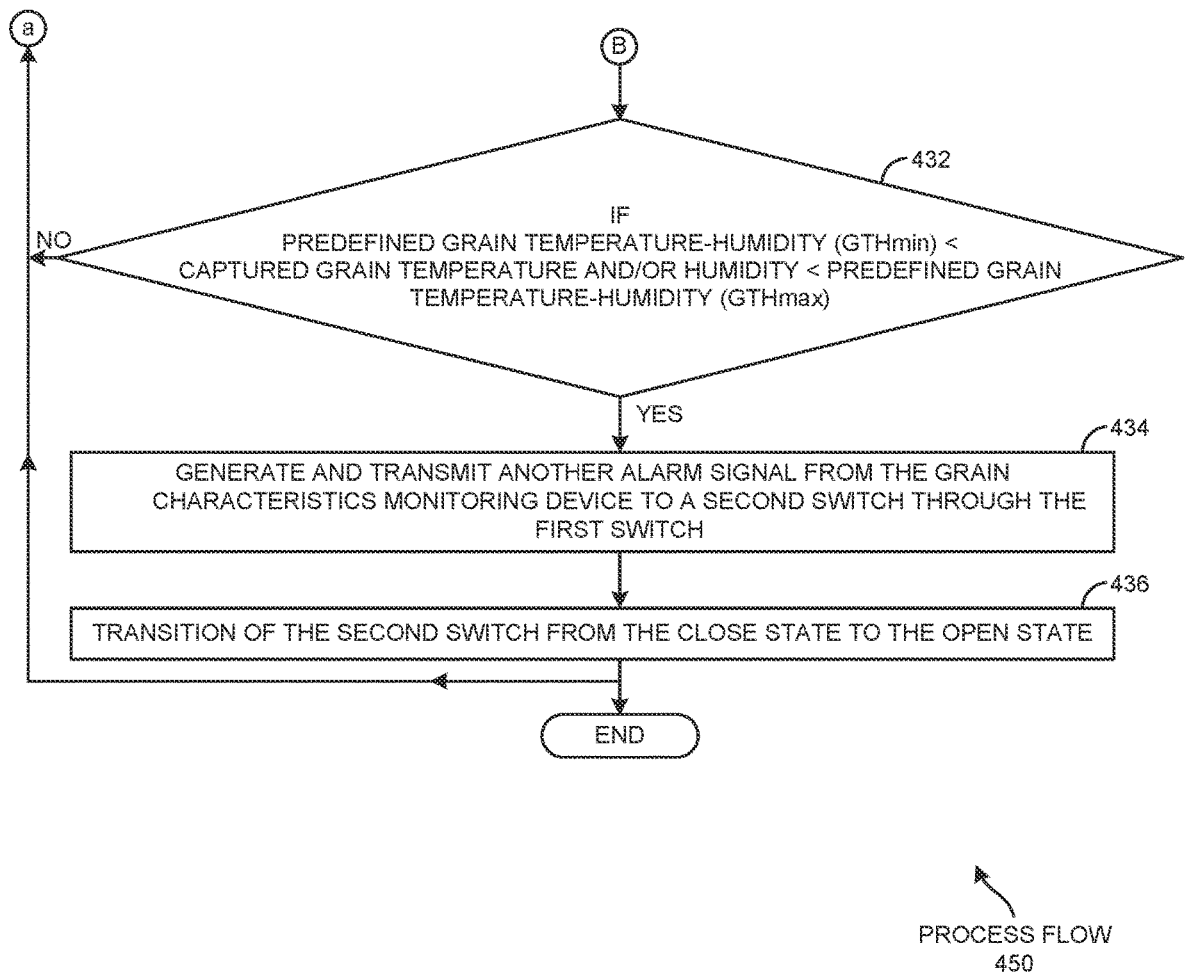

FIG. 4A-4C is a process flow 450 detailing the operations of the automatic grain ventilation system 100 of FIG. 1 to activate and/or deactivate the plurality of ventilation fans 104 through the weather station 108 and/or the grain characteristics monitoring devices (e.g., 110A and 110B), according to one or more embodiments.

In operation 402, the ventilation control system 101 may be activated to enable the plurality of ventilation fans 104 to run constantly. In operation 404, a desired external temperature-humidity range 216A and a desired grain temperature-humidity range 216B may be configured through the weather station 108 and the plurality of grain characteristics monitoring devices (e.g., 110A and 110B) respectively. In operation 406, the real-time external temperature 300 and external humidity 302 may be continuously captured through the environmental sensor 204 to constantly display the captured parameters (e.g., 300 and 302) on the weather station display 200 in real-time, according to one embodiment.

In operation 408, the real-time grain temperature 312A, 312B and grain humidity 314A,314B may be continuously captured through the plurality of sensing probes (e.g., 112A and 112B) and constantly display the captured parameters (e.g., 312A,312B, and 314A,314B) on the associated display screens (e.g., 214A and 214B) of the plurality of grain characteristics monitoring devices (e.g., 110A and 110B) in real-time. In operation 410, the captured external temperature 300 and/or external humidity 302 may be compared with the predefined external temperature-humidity range 216A until the captured external temperature 300 and/or external humidity 302 deviate from the predefined external temperature-humidity range 216A, according to one embodiment.

In operation 412, the alarm signal 216 may be generated and transmitted by the weather station 108 to the first switch 206 of the fan switch control unit 106 when the captured external temperature 300 and/or external humidity 302 deviate from the predefined external temperature-humidity range 216A. In operation 414, the first switch 206 may get converted from close state to open state. In operation 416, the alarm signal 218 may be transmitted from the first switch 206 to the plurality of ventilation fans 104 to deactivate the plurality of ventilation fans 104. In operation 418, the captured external temperature 300 and/or external humidity 302 may be compared with the predefined external temperature-humidity range 216A, according to one embodiment.

In operation 420, the alarm signal 218 may be generated and transmitted by the weather station 108 to the first switch 206 when the captured external temperature 300 and/or external humidity 302 return within the predefined external temperature-humidity range 216A. In operation 422, the first switch 206 may get converted from open state to close state. The environmental sensor 204 continues to identify the condition (e.g., operation 410) for the external temperature 300 and/or the external humidity 302. In operation 424, the captured grain temperature 312A,312B and/or grain humidity 314A,314B may be compared with the predefined grain temperature-humidity range 216B, according to one embodiment.

In operation 426, the alarm signal 218 may be generated and transmitted by the grain characteristics monitoring device (e.g., 110A and/or 110B) to the second switch 208 through the first switch 206 when the captured grain temperature 312A,312B and/or grain humidity 314A,314B deviate from the predefined grain temperature-humidity range 216B. In operation 428, the second switch 208 may get converted from open state to close state. In operation 430, the alarm signal 218 may be transmitted from the second switch 208 to the plurality of ventilation fans 104 to keep the plurality of ventilation fans 104 activated until the captured grain temperature 312A,312B and/or grain humidity 314A,314B return within the predefined grain temperature-humidity range 216B, according to one embodiment.

In operation 432, the captured grain temperature 312A, 312B and/or grain humidity 314A,314B may be compared with the predefined grain temperature-humidity range 216B. In operation 434, the alarm signal 218 may be generated and transmitted by the grain characteristics monitoring device (e.g., 110A and/or 110B) to the second switch 208 through the first switch 206 when the captured grain temperature and/or grain humidity 314A,314B return within the predefined grain temperature-humidity range 216B. In operation 436, the second switch 208 may get converted from close state to open state, according to one embodiment.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. An automatic grain ventilation system to maintain a predefined temperature-humidity range of the grains stored in a storage bin, comprising:
   a plurality of ventilation fans installed to the storage bin to enable moving the air through the stored grains; and
   a ventilation control system mounted on the storage bin, comprising:
   a fan switch control unit coupled to the plurality of ventilation fans to constantly operate the plurality of ventilation fans, comprising:
   a first switch, and
   a second switch,
      wherein the first switch and the second switch are solid-state switches to operate in at least one of open state and close state,
      wherein initially the first switch to remain in the close state and the second switch to remain in the open state, and
      wherein at least one of the first switch and the second switch to transmit an alarm signal to the plurality of ventilation fans for at least one of activation and deactivation of the plurality of ventilation fans when the alarm signal is received,
   a weather station configured to set a desired external temperature-humidity range and identify the weather conditions to ventilate the stored grains,
      wherein the weather station comprises an environmental sensor to continuously capture at least one of the real-time external temperature and external humidity,
      wherein the weather station comprises a controller to generate the alarm signal and transmit to the first switch of the fan switch control unit to deactivate the plurality of ventilation fans when at least one of the captured external temperature and external humidity deviate from a predefined external temperature-humidity range, and
      wherein the controller to generate another alarm signal and to transmit to the first switch to convert the first switch into close state when at least one of the captured external temperature and external humidity return within the predefined external temperature-humidity range,
   a first grain characteristics monitoring device coupled to a first sensing probe configured to set a desired grain temperature-humidity range,
      wherein a first end of the first sensing probe coupled to the first grain characteristics monitoring device and a second end of the first sensing probe positioned in the storage bin to continuously capture the real-time temperature-humidity of the surrounding grains,
      wherein the first grain characteristics monitoring device comprises a first alert controller to generate and transmit the alarm signal to the second switch through the first switch of the fan switch control unit to activate the plurality of ventilation fans when at least one of the captured grain temperature and grain humidity deviate from a predefined grain temperature-humidity range, and
      wherein the first alert controller to generate and transmit the alarm signal to the second switch to convert the second switch into open state when at least one of the captured grain temperature and grain humidity return within the predefined grain temperature-humidity range, and
   a second grain characteristics monitoring device coupled to a second sensing probe configured to set a desired grain temperature-humidity range,
      wherein a first end of the second sensing probe coupled to the second grain characteristics monitoring device and a second end of the second sensing probe positioned in the storage bin to continuously capture the real-time temperature-humidity of the surrounding grains,
      wherein the second grain characteristics monitoring device comprises a second alert controller to generate and transmit the alarm signal to the second switch through the first switch of the fan switch control unit to activate the plurality of ventilation fans when at least one of the captured grain temperature and grain humidity deviate from the predefined grain temperature-humidity range, and wherein the second alert controller to generate and transmit the alarm signal to the second switch to convert the second switch into open state when at least one of the captured grain temperature and grain humidity return within the predefined grain temperature-humidity range.

2. The automatic grain ventilation system of claim 1, wherein the first switch and the second switch to change their operating states when the alarm signal is received, and
wherein the first switch and the second switch of the fan switch control unit are arranged such that the first switch enables the flow of the alarm signal to at least one of resist and allow it to pass through to the second switch.

3. The automatic grain ventilation system of claim 1, wherein the fan switch control unit comprises a timer circuit to enable the delayed start of the plurality of ventilation fans when the plurality of ventilation fans are activated through at least one of the first switch and the second switch.

4. The automatic grain ventilation system of claim 1, wherein the weather station with the controller is configured to constantly display a digital readout for at least one of the real-time external temperature and external humidity captured through the environmental sensor on a weather station display.

5. The automatic grain ventilation system of claim 1, wherein the first grain characteristics monitoring device to constantly display a digital readout for at least one of the real-time grain temperature and grain humidity captured through the first sensing probe on a first display screen of the first grain characteristics monitoring device, and
wherein the second grain characteristics monitoring device to constantly display a digital readout for at least one of the real-time grain temperature and grain humidity captured through the second sensing probe on a second display screen of the second grain characteristics monitoring device.

6. The automatic grain ventilation system of claim 1, wherein the automatic grain ventilation system further comprises an alarm unit mounted on the storage bin to provide at least one of an audio signal and a visual signal to an operator to enable the operator to manually operate the plurality of ventilation fans through the fan switch control unit.

7. The automatic grain ventilation system of claim 6, wherein the fan switch control unit comprises a plurality of operating switches, a set of flashing lights, and a timer unit to enable the operator to manually operate the plurality of ventilation fans on receiving a warning signal from the alarm unit.

8. The automatic grain ventilation system of claim 1, wherein the fan switch control unit furthermore comprises a relay and the weather station further comprises a thermostat sensor, and
wherein the relay receives a steady signal from the thermostat sensor before the activation of the plurality of ventilation fans to avoid the short-cycling conditions in the plurality of ventilation fans.

9. An automatic grain ventilation system, comprising:
a grain storage bin;
a plurality of ventilation fans installed to the grain storage bin to run constantly until an alarm signal is received to the plurality of ventilation fans;
an alarm unit mounted on the grain storage bin to provide at least one of an audio signal and a visual signal to the operator; and
a ventilation control system mounted on the grain storage bin, comprising:
a fan switch control unit coupled to the plurality of ventilation fans to continuously operate the plurality of ventilation fans through at least one of a first switch and a second switch,
wherein the first switch and the second switch are solid-state switches operated in at least one of open state and close state,
wherein at least one of the first switch and the second switch to transmit the alarm signal to the plurality of ventilation fans for at least one of activation and deactivation the plurality of ventilation fans, and
wherein the fan switch control unit comprises a timer circuit to enable the delayed start of the plurality of ventilation fans when the plurality of ventilation fans are activated through at least one of the first switch and the second switch,
a weather station configured to set a desired external temperature-humidity range and identify the weather conditions to ventilate the stored grains,
wherein the weather station comprises an environmental sensor to continuously capture at least one of the real-time external temperature and external humidity,
wherein the weather station comprises a controller to generate the alarm signal and transmit to the first switch of the fan switch control unit to deactivate the plurality of ventilation fans when at least one of the captured external temperature and external humidity deviate from a predefined external temperature-humidity range, and
wherein the controller to generate another alarm signal and to transmit to the first switch to convert the first switch into close state when at least one of the captured external temperature and external humidity return within the predefined external temperature-humidity range, and
a plurality of grain characteristics monitoring devices configured to set a desired grain temperature-humidity range and identify the conditions to ventilate the stored grains at multiple locations,
wherein each grain characteristics monitoring device is coupled to at least one sensing probe,
wherein one end of each sensing probe is positioned at different locations in the grain storage bin to capture the real-time temperature-humidity of the surrounding grains,
wherein each grain characteristics monitoring device comprises an alert controller to generate and transmit the alarm signal to the second switch through the first switch of the fan switch control unit to activate the plurality of fans when at least one of the grain temperature and the grain humidity captured through any one of the sensing probes deviate from a predefined grain temperature-humidity range, and
wherein the alert controller of at least one of the grain characteristics monitoring devices to generate and transmit another alarm signal to the second switch through the first switch to convert the second switch into open state when at least one of the grain temperature and the grain humidity captured through any one of the sensing probes return within the predefined grain temperature-humidity range.

10. The automatic grain ventilation system of claim 9, wherein initially the first switch remains in the close state, and
wherein the second switch remains in the open state.

11. The automatic grain ventilation system of claim 9, wherein the first switch and the second switch to change their operating states when the alarm signal is received, and
wherein the first switch and the second switch are arranged such that the first switch enables the flow of the alarm signal to at least one of resist and allow it to pass through to the second switch.

12. The automatic grain ventilation system of claim 9, wherein the weather station with the controller is configured to constantly display a digital readout for at least one of the real-time external temperature and external humidity captured through the environmental sensor on a weather station display.

13. The automatic grain ventilation system of claim 9, wherein each grain characteristics monitoring device to constantly display a digital readout for at least one of the real-time grain temperature and grain humidity on the associated display screen of the grain characteristics monitoring device, and
wherein the real-time temperature and humidity of the surrounding grains is captured through at least one of the sensing probes coupled to the associated grain characteristics monitoring device.

14. The automatic grain ventilation system of claim 9, wherein the fan switch control unit comprises a plurality of operating switches, a set of flashing lights, and a timer unit to enable the operator to manually operate the plurality of ventilation fans on receiving a warning signal from the alarm unit.

15. The automatic grain ventilation system of claim 9, wherein the fan switch control unit further comprises a relay,
wherein the weather station further comprises a thermostat sensor, and
wherein the relay receives a steady signal from the thermostat sensor before the activation of the plurality of ventilation fans to avoid the short-cycling conditions in the plurality of ventilation fans.

* * * * *